(12) United States Patent  
Narendra et al.

(10) Patent No.: US 9,087,184 B2  
(45) Date of Patent: *Jul. 21, 2015

(54) MOBILE DEVICE WITH DESKTOP SCREEN INDICATORS

(75) Inventors: Siva G. Narendra, Portland, OR (US); Prabhakar Tadepalli, Bangalore (IN)

(73) Assignee: Tyfone, INC., Portland, OR (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/591,213

(22) Filed: Aug. 21, 2012

(65) Prior Publication Data

US 2013/0305352 A1 Nov. 14, 2013

Related U.S. Application Data

(63) Continuation of application No. 13/470,139, filed on May 11, 2012.

(51) Int. Cl.

| | |
|---|---|
| *G06F 12/00* | (2006.01) |
| *G06F 12/14* | (2006.01) |
| *G11C 7/00* | (2006.01) |
| *G06F 21/31* | (2013.01) |
| *H04M 1/673* | (2006.01) |
| *G06F 3/0488* | (2013.01) |
| *G06F 1/16* | (2006.01) |
| *G06F 11/30* | (2006.01) |
| *H04N 7/167* | (2011.01) |
| *H04M 1/725* | (2006.01) |

(52) U.S. Cl.  
CPC .............. *G06F 21/31* (2013.01); *G06F 1/1626* (2013.01); *G06F 3/0488* (2013.01); *H04M 1/673* (2013.01); *H04M 1/72583* (2013.01); *H04M 2250/22* (2013.01)

(58) Field of Classification Search  
USPC ............ 726/19, 2–6; 713/168–174, 182–186, 713/202; 709/206, 225, 229, 249, 389  
See application file for complete search history.

(56) References Cited

U.S. PATENT DOCUMENTS

| | | | |
|---|---|---|---|
| 8,370,263 | B2 | 2/2013 | Williams et al. |
| 2003/0120957 | A1 | 6/2003 | Pathiyal |
| 2006/0143688 | A1 | 6/2006 | Futoransky et al. |
| 2012/0084734 | A1* | 4/2012 | Wilairat ......................... 715/863 |
| 2012/0137369 | A1 | 5/2012 | Shin et al. |
| 2012/0150669 | A1* | 6/2012 | Langley et al. ................. 705/16 |
| 2012/0166944 | A1 | 6/2012 | Cotterill |
| 2013/0082974 | A1* | 4/2013 | Kerr et al. ..................... 345/174 |
| 2013/0091543 | A1 | 4/2013 | Wade et al. |
| 2013/0110719 | A1* | 5/2013 | Carter et al. .................... 705/44 |
| 2013/0246268 | A1 | 9/2013 | Moshfeghi |

OTHER PUBLICATIONS

U.S. Appl. No. 13/470,139 Office Action Mailed Dec. 9, 2013, 19 pages.  
U.S. Appl. No. 13/470,139 Office Action Mailed May 15, 2013, 22 pages.

(Continued)

*Primary Examiner* — Evans Desrosiers  
(74) *Attorney, Agent, or Firm* — Dana B. LeMoine

(57) ABSTRACT

A mobile device includes a user interface that has a plurality of non-password-protected desktop screens and at least one password protected desktop screen. The mobile device includes a touch sensitive display device that accepts gestures used to navigate between the desktop screens. Applications may be installed to password protected desktop screens.

11 Claims, 15 Drawing Sheets

(56) References Cited

OTHER PUBLICATIONS

Sven Bugiel, Alexandra Dmitrienko, Kari Kostiainen, Ahmad-Reza Sadeghi, and Marcel Winandy. 2010. TruWalletM: secure web authentication on mobile platforms. In Proceddings of the Second international conference on Trusted Systems (INTRUST'10), Liqun Chen and Moti Yun (Eds.). Springer-Verlag, Berlin, Heidelberg, 219-236.

U.S. Appl. No. 13/470,139 Office Action May 29, 2014, 23 pages.
U.S. Appl. No. 13/470,163 Office Action Jun. 16, 2014, 19 pages.

* cited by examiner

MOBILE DEVICE WITH DESKTOP SCREEN INDICATORS

FIELD

The present invention relates generally to mobile devices, and more specifically to user interfaces in mobile devices.

BACKGROUND

Mobile devices with touch sensitive displays typically include a desktop screen that shows icons used to launch applications. Some prior art mobile devices include multiple desktop screens that can be navigated using gestures on the touch sensitive display. FIG. 1 shows one such prior art mobile device 100 displaying one desktop screen 110 with two application icons. A user provides a left-to-right or right-to-left swipe gesture across the touch sensitive display to navigate from one desktop screen to the next. FIG. 2 shows a prior art logical orientation of multiple desktop screens that is navigated using swipe gestures. When mobile device 100 is displaying desktop screen 110, a left-to-right swipe gesture navigates from desktop screen 110 to desktop screen 210, and mobile device 100 displays desktop screen 210 as a result. Likewise, when mobile device 100 is displaying desktop screen 110, a right-to-left swipe gesture navigates from desktop screen 110 to desktop screen 220, and mobile device 100 displays desktop screen 220 as a result.

DESCRIPTION OF EMBODIMENTS

Figure 1:
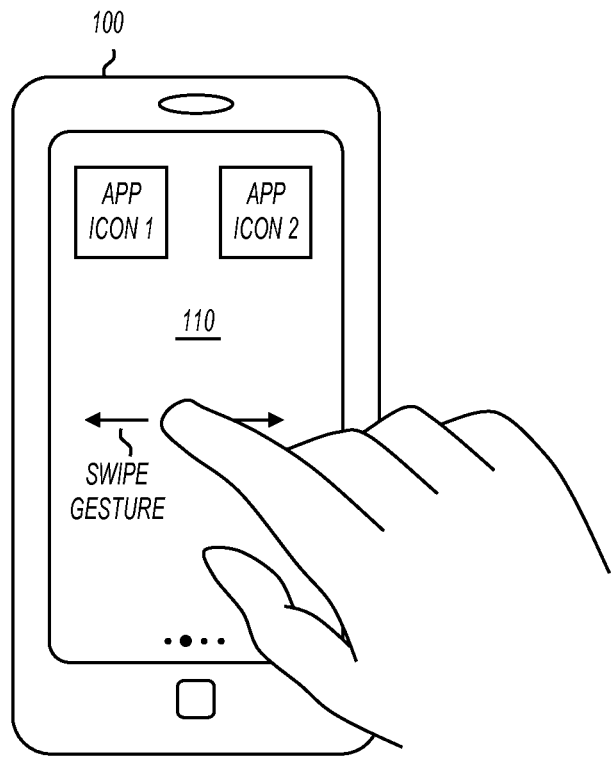
FIG. 1 shows a prior art mobile device that navigates desktop screens with swipe gestures.
Figure 2:
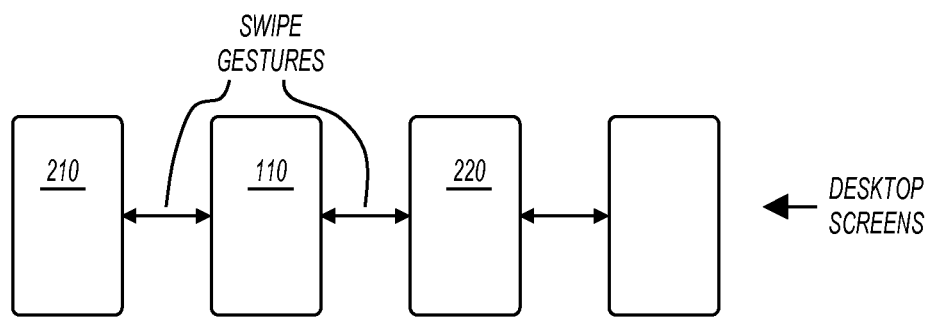
FIG. 2 shows a prior art logical orientation of multiple desktop screens.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 3:
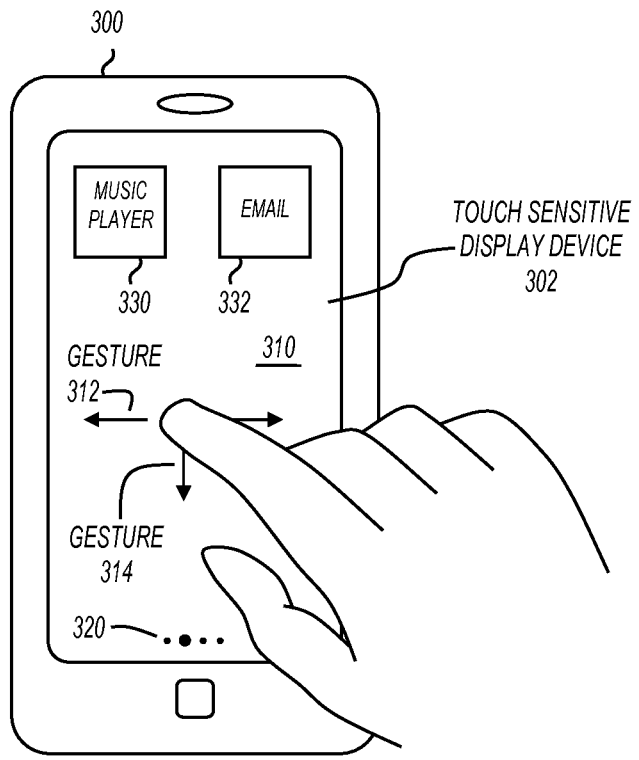
FIG. 3 shows a mobile device in accordance with various embodiments of the invention.

FIG. 3 shows a mobile device in accordance with various embodiments of the present invention. Mobile device 300 includes a touch sensitive display device 302 that is shown displaying a desktop screen 310. Touch sensitive display device 302, in combination with processing circuits coupled thereto, detects gestures made by a user while touching device 302. For example, a human hand is shown making one of many gestures on touch sensitive display device 302.

Mobile device 300 may be any mobile device that includes multiple desktop screens navigable by gestures. Examples include, but are not limited to, mobile phones, tablet computers, personal digital assistants, and the like.

Mobile device 300 may detect multiple different types of gestures. For example, mobile device 300 may detect a first gesture 312 used to navigate between non-password protected desktop screens and may detect a second gesture 314 used to navigate from a non-password-protected desktop screen to a password protected desktop screen. This is described in more detail below.

Mobile device 300 is capable of displaying multiple desktop screens. Desktop screens on mobile device 300 display content such as application icons, widgets, and the like. Application icons that display on desktop screens are used to launch applications. For example, a user might launch a music player application by tapping on icon 330. Also for example, the user might launch an email application by tapping on icon 332. Both application icons 330 and 332 are displayed on desktop screen 310.

In some embodiments, mobile device 300 displays desktop screen indicator 320 to provide a visual indication of the desktop screen currently being displayed. Additional desktop screen indicator embodiments are described further below.

Figure 4:
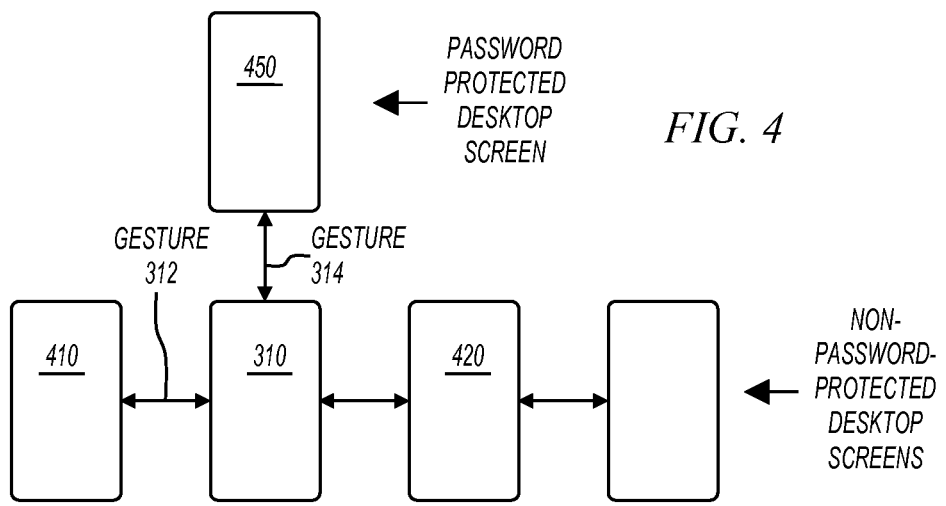
FIG. 4 shows a logical orientation of multiple desktop screens in accordance with various embodiments of the invention.

A user may navigate between desktop screens using gestures. For example, a user may navigate between desktop screens that are logically oriented side-by-side by using a swipe gesture from left-to-right or from right-to-left such as gesture 312. Referring now to FIG. 4, desktop screen 310 is shown logically oriented with desktop screen 410 to the left and desktop screen 420 to the right. A user may navigate from desktop screen 310 to desktop screen 410 by entering a left-to-right swipe gesture 312. The user may also navigate from desktop screen 310 to desktop screen 420 by entering a right-to-left swipe gesture 312.

Desktop screens 410, 310, and 420 are examples of non-password-protected desktop screens. The user may freely navigate between these desktops screens without any additional layers of authentication. When the user gestures to navigate between the non-password-protected desktop screens, the non-password protected screens display without any additional input from the user.

In addition to non-password-protected desktop screens, mobile device 300 includes at least one password protected desktop screen 450. A user may navigate from a non-password-protected desktop screen (e.g., 310) to a password protected screen (e.g., 450) by gesturing with gesture 314. When mobile device 300 recognizes gesture 314 while displaying a non-password-protected desktop screen, the mobile device requires an additional layer of authentication prior to navigating to the password protected desktop screen. This is described further below.

Although gesture 314 is shown as a vertical swipe gesture, this is not a limitation of the present invention. For example, gesture 314 may be non-vertical, or may be something other than a single swipe. In some embodiments, gesture 314 requires multiple movements, such as connecting imaginary dots in sequence on touch sensitive display device 302.

Desktop screens 310, 410, 420, and 450 are all desktop screens that display application icons and other content. For example, applications may be launched using icons that are displayed on any of desktop screens 310, 410, 420, and 450. Further, a user may navigate between all of the desktop screens using gestures, although further authentication may be required when navigating from a non-password-protected desktop screen to a password protected desktop screen.

In some embodiments, applications may be launched from icons on desktop screens, and may also be launched using other mechanisms provided by mobile device 300. For example, an applications folder may be provided in a directory structure accessible via menus, and the application folder may also display icons that allow applications to be launched. In some embodiments, applications may only be launched from desktop screens. For example, applications that are installed to password-protected desktop screens may only be accessible from those desktop screens. This prevents unauthorized access to those applications.

In some embodiments, password protected desktop screens display application icons that are grouped in categories. For example, financial applications may be installed on one password protected desktop screen or one set of password protected desktop screens. Also for example, applications that hold other sensitive documents or data may be installed on one password protected desktop screen or one set of password protected desktop screens. Example password protected desktop screens are described below as "wallet desktop screens" that control access to finance related applications, but this is not a limitation of the present invention. Access to any type of application may be controlled through password protected desktop screens without departing from the scope of the present invention.

Desktop screens and the logic that interprets gestures are part of a user interface component within mobile device 300. The user interface component may include many other elements, including for example, menus, feedback devices (audio, haptic, etc.) window managers, file managers, and the like. The user interface component is described in more detail below with reference to FIG. 11.

Figure 5:
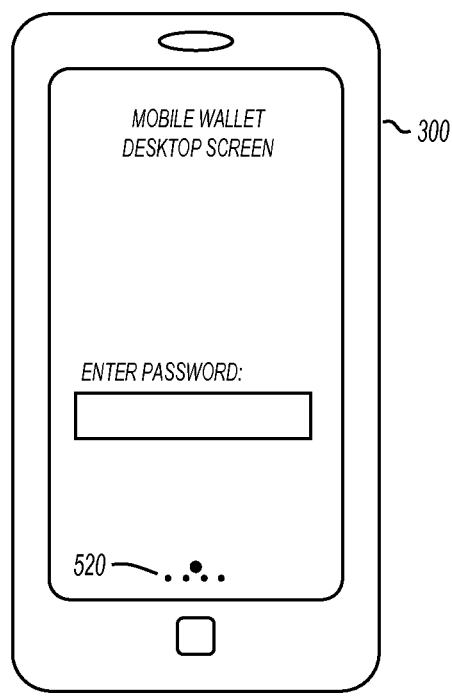
FIG. 5 shows a password protected desktop screen prompting for a password in accordance with various embodiments of the present invention.

FIG. 5 shows a password protected desktop screen prompting for a password in accordance with various embodiments of the present invention. Mobile device 300 prompts for a password when a gesture is recognized that attempts to navigate from a non-password-protected desktop screen to a password-protected desktop screen. As shown in FIG. 5, a mobile wallet desktop screen may be password protected, and mobile device 300 prompts for the password when a gesture is recognized that attempts to navigate to the mobile wallet desktop screen.

Figure 6:
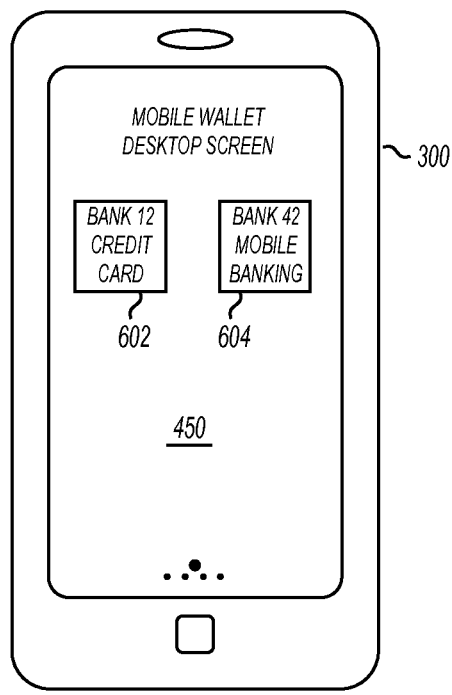
FIG. 6 shows a password protected desktop screen displaying mobile wallet applications in accordance with various embodiments of the invention.

Note that the desktop screen indicator 520 has changed to signify the location of the password protected mobile wallet desktop screen 450 in the logical orientation shown in FIG. 4. After the user enters the password and it is validated, then the navigation to the password protected mobile wallet desktop screen is allowed. An example mobile wallet desktop screen is shown in FIG. 6.

In some embodiments, the password is validated using software within mobile device 300, and in other embodiments, the password is validated using hardware within, or coupled to, mobile device 300. For example, the password may be routed to a smartcard secure element for validation. The smartcard secure element may be in any location, including within mobile device 300, on a card in an add-on slot of mobile device, or in communications with mobile device over a contactless interface. Cards in add-on slots may or may not be removable. For example, a memory card may be user accessible and removable, or may be embedded deep within the mobile device to provide system memory, and nonremovable. Smartcard secure elements and their various possible locations are described more fully below. In some embodiments, passwords may be alphanumeric only, and in other embodiments, passwords may be numeric only and yet in others it may include special characters.

As used herein, the terms "password protected" and "non-password-protected" refer to different levels of authentication required to access different desktop screens. These different levels of authentication may coexist with further levels of authentication in the mobile device. For example, an "unlock" feature of mobile device 300 may require a user to enter a password, a gesture, or the like. The user unlocks the mobile device by authenticating to the mobile device using the password or gesture required for the unlock feature. Once the mobile device is unlocked, the non-password-protected desktop screens may be accessed without further authentication, whereas the password protected desktop screens may require further authentication as described above. Accordingly, the password protection used to lock the mobile device is different from the additional authentication used when navigating from a non-password protected desktop screen to a password protected desktop screen.

The example of FIG. 5 shows a password mechanism providing an additional level of authentication, although this is not a limitation of the present invention. For example, a user may be allowed to navigate to the password protected desktop screens when an additional hardware token is present (e.g., microSD card, USB dongle, Bluetooth device, NFC device). In these embodiments, the token provides the additional level of authentication, and a password may not be required. In other embodiments, the additional level of authentication may be provided by bioinformation (e.g., fingerprint, face recognition, iris scan, etc). In still further embodiments, a challenge question and response mechanism may be used to provide the additional level of authentication. Any authentication mechanism may be employed without departing from the scope of the present invention.

Although two applications are shown installed on password protected desktop screen 450 in FIG. 5, this is not a limitation of the present invention. Any number of applications may be installed to a password protected desktop screen, including zero, one, or more than one.

FIG. 6 shows a password protected desktop screen displaying mobile wallet applications in accordance with various embodiments of the invention. Mobile device 300 is shown displaying icon 602 for a mobile payment application "Bank 12 Credit Card" and icon 604 for a mobile banking application "Bank 42 Mobile Banking." In the example of FIG. 6, these two applications are grouped together as financial applications and are installed to the same password protected desktop screen.

In some embodiments, applications launched from mobile wallet desktop screen 450 do not require further authentication beyond the authentication necessary for the user to reach the mobile wallet desktop screen. This provides a level of convenience to a user that wishes to open multiple financial applications without entering a password for each one. The user can authenticate to the mobile wallet desktop screen once, and then select which mobile wallet application to open, or even open multiple mobile wallet applications without further authentication.

Figure 7:
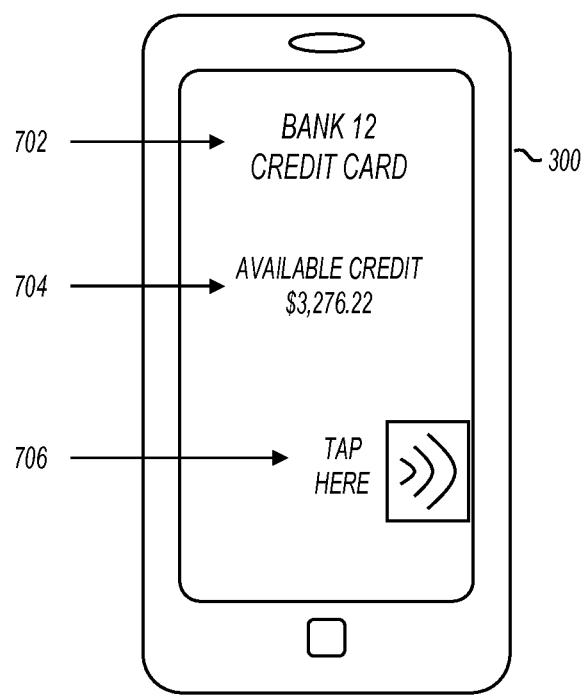
FIG. 7 shows a screenshot of a financial application in accordance with various embodiments of the present invention.

FIG. 7 shows a screenshot of a financial application in accordance with various embodiments of the present invention. FIG. 7 shows mobile device 300 displaying the Bank 12 Credit Card application. This application is launched from mobile wallet desktop screen 450 (FIG. 6) by tapping icon 602. In the embodiment of FIG. 7, no additional authentication (beyond the authentication necessary to navigate to wallet desktop screen 450) was necessary for the user to launch Bank 12 Credit Card. The Bank 12 Credit Card application is an example of a mobile payment application that allows a user to make credit card payments using a credit card issued by Bank 12.

As shown in FIG. 7, the mobile payment application may display information specific to an application provider (e.g., branding information 702), information specific to a user (e.g., available credit information 704), and mobile device specific information (e.g., NFC antenna tap location information 706).

The device specific information may show any type of information. Examples related to NFC payments include showing a region on the mobile device to tap, orientation of the mobile device when tapping, whether to tap on the front or back of the mobile device. Further, this information may be color coded, or maybe dynamic content that changes shape, color, or text, in response to user actions. For example, the TAP HERE icon shown in FIG. 7 may change size or color, or may animate when a successful exchange of information over a contactless link (e.g., NFC) has occurred. In some embodiments the dynamic content could also be represented with audio or haptic feedback. In some embodiments, the mobile device specific information may be maintained in a centralized database that is updated when new mobile device models become available.

Figure 8:
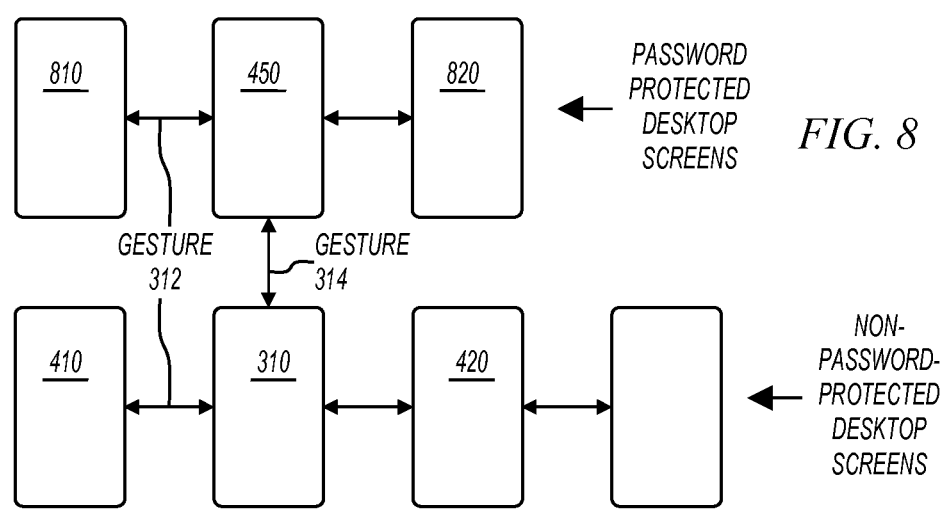
FIGS. 8 and 9 show logical orientations of multiple desktop screens in accordance with various embodiments of the invention.
Figure 9:
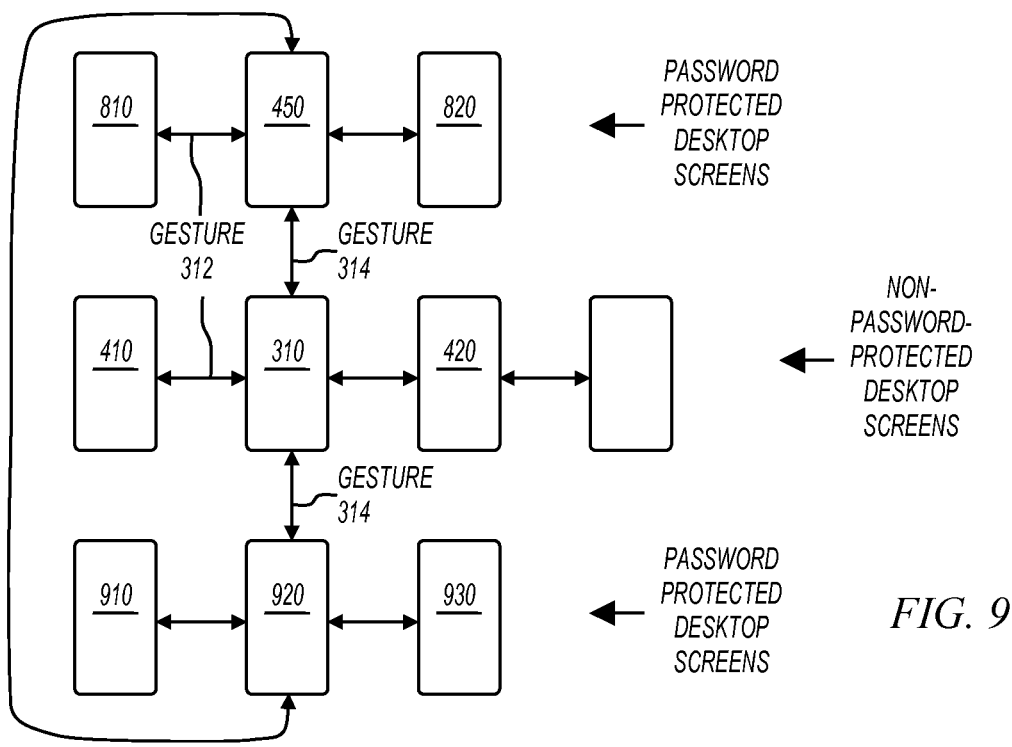

FIGS. 8 and 9 show logical orientations of multiple desktop screens in accordance with various embodiments of the invention. FIG. 8 shows non-password-protected desktop screens 410, 310, and 420. A user may freely navigate between these desktop screens without additional authentication as described above. FIG. 8 also shows multiple password protected desktop screens 810, 450, and 820. In some embodiments, a user may freely navigate between the multiple password protected screens once authenticated to them. For example, a user may authenticate to a password protected desktop screen 450 after providing a gesture 314 to navigate from a non-password-protected desktop screen 310 to password protected desktop screen 450, after which the user may freely navigate between the password protected desktop screens (e.g., 810, 450, 820) without additional authentication.

FIG. 9 shows all of the desktop screens shown in FIG. 8, and in addition shows password protected screens 910, 920, and 930. In the example of FIG. 8, password protected desktop screens 810, 450, and 820, form one logical row of password protected screens that can be navigated with gesture 312, and password protected desktop screens 910, 920, and 930 form a second logical row of password protected desktop screens that can be navigated with gesture 312.

In some embodiments, authentication to one logical row of password protected desktop screens with provide authentication to all logical rows of password protected desktop screens. For example, a user that has authenticated to password protected desktop screen 450 as described above may be able to access password protected desktop screen 920 with an additional gesture 314 without additional authentication. In other embodiments, each row of password protected desktop screens requires an additional level of authentication.

In some embodiments, rows of desktop screens may be accessed in a circular manner as shown in FIG. 9. For example, continuous gestures in one direction will repeatedly scroll through the rows of desktop screens. In other embodiments, rows of desktop screens are navigated in a noncircular manner such that if a user has navigated to the bottom-most row, the only option is to navigate up, and if the user has navigated to the top-most row, the only option is to navigate down.

Figure 10:
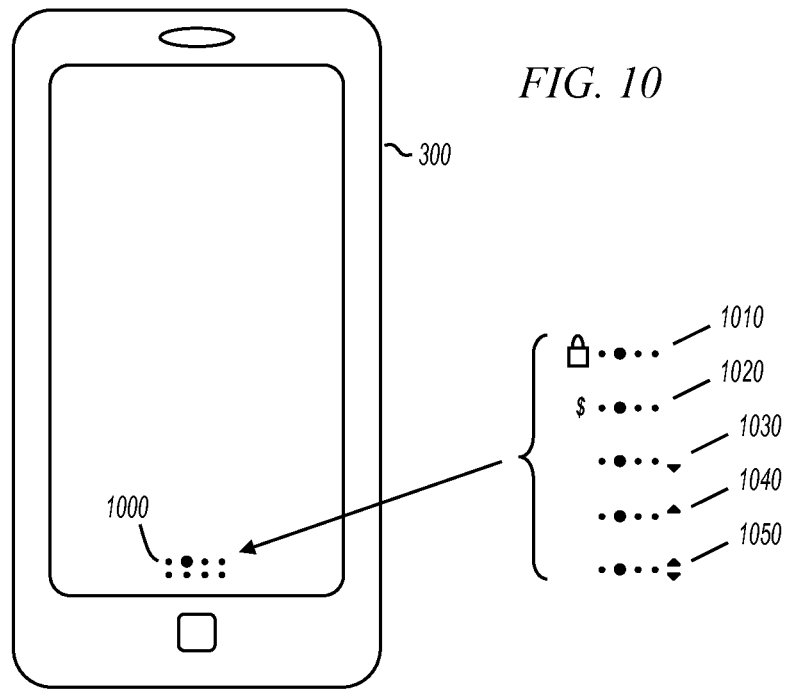
FIG. 10 shows various desktop screen indicators in accordance with various embodiments of the present invention.

FIG. 10 shows various desktop screen indicators in accordance with various embodiments of the present invention. Indicator 1000 shows two rows to indicate that the desktop screen currently displayed is in a top row of two rows. This may correspond to the display of desktop screen 450 when two rows of desktop screens exist (FIG. 8).

Various embodiments of the present invention use different desktop screen indicators. In some embodiments, the desktop screen indicators include multiple rows as shown at 1000, and in other embodiments, the desktop screen indicators include a single row with additional icons to signify the current row, or possible scroll directions. For example, indicator 1010 includes a lock icon to signify that the current row is a row of password protected desktop screens. Also for example, indicator 1020 includes a dollar sign icon to indicate that the current row is a row of mobile wallet desktop screens. In still further examples, indicators 1030, 1040, and 1050 include icons to indicate possible scroll directions. In some embodiments, multiple row indicators include additional icons. For example, indicator 1000 may include a lock icon and/or a dollar sign icon, as well as up and down arrows to indicate scroll directions. At least one row of desktop screen indicators maybe displayed at any given time.

Figure 11:
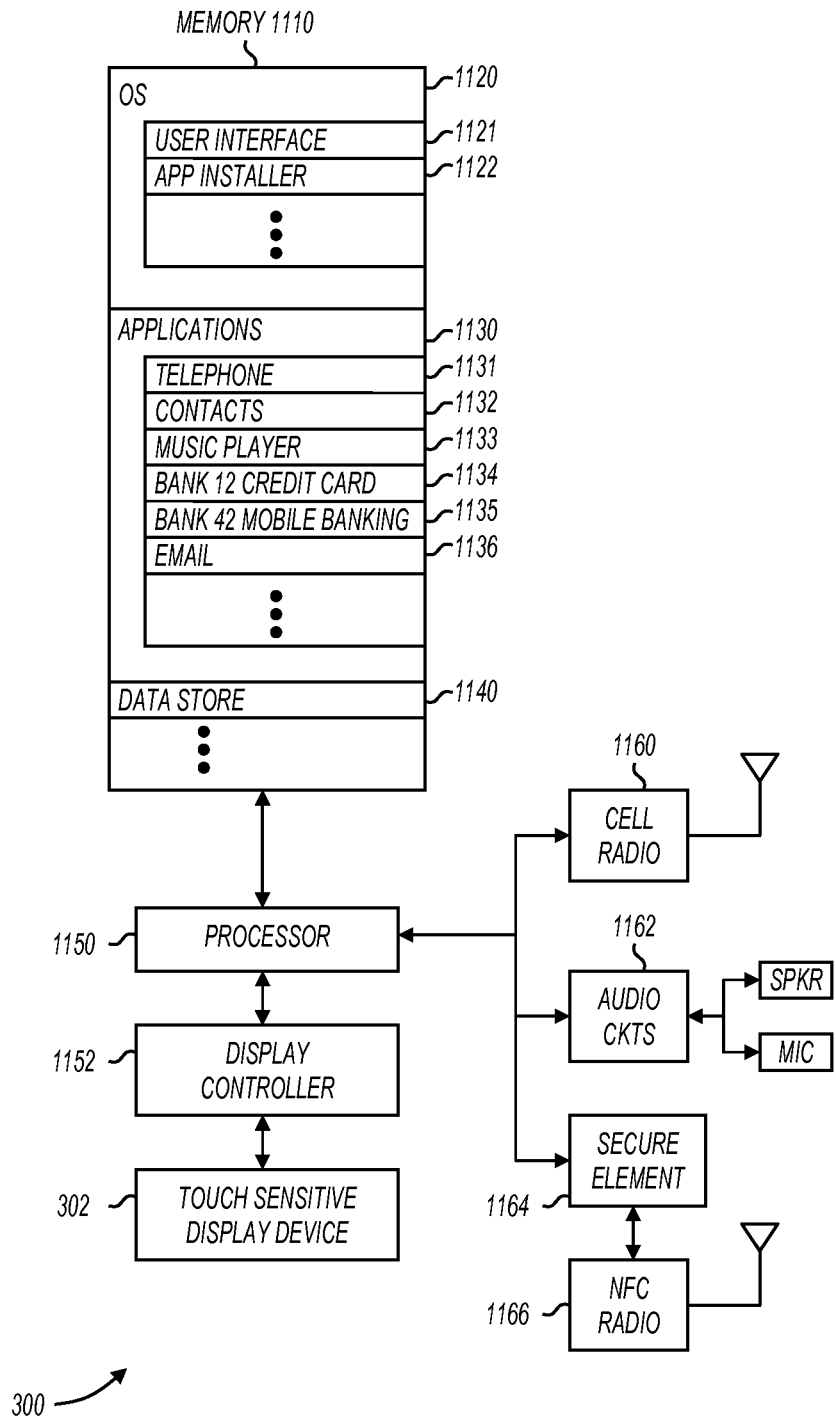
FIG. 11 shows a block diagram of a mobile device in accordance with various embodiments of the present invention.

FIG. 11 shows a mobile device in accordance with various embodiments of the present invention. Mobile device 300 includes processor 1150, memory 1110, display controller 1152, touch sensitive display device 302, cellular radio 1160, audio circuits 1162, secure element 1164, and near field communications (NFC) radio 1166. Mobile device 300 may be any type of mobile device that includes the components shown. For example, in some embodiments, mobile device 300 may be a cell phone, a smartphone, a tablet computer, a laptop computer, or the like.

Processor 1150 may be any type of processor capable of executing instructions store in memory 1110 and capable of interfacing with the various components shown in FIG. 11. For example, processor 1150 may be a microprocessor, a digital signal processor, an application specific processor, or the like. In some embodiments, processor 1150 is a component within a larger integrated circuit such as a system on chip (SOC) application specific integrated circuit (ASIC).

Display controller 1152 provides an interface between processor 1150 and touch sensitive display device 302. In some embodiments, display controller 1152 is integrated within processor 1150, and in other embodiments, display controller 1152 is integrated within touch sensitive display device 302.

Touch sensitive display device 302 is a display device that includes a touch sensitive surface, sensor, or set of sensors that accept input from a user. For example, touch sensitive display device 302 may detect when and where an object touches the screen, and may also detect movement of an object across the screen. When touch sensitive display device detects input, display controller 1152 and processor 1150 (in association with user interface component 1121) determine whether a gesture is to be recognized.

Touch sensitive display device 302 may be manufactured using any applicable display technologies, including for example, liquid crystal display (LCD), active matrix organic light emitting diode (AMOLED), and the like. Further, touch sensitive display device 302 may be manufactured using any application touch sensitive input technologies, including for example, capacitive and resistive touch screen technologies, as well as other proximity sensor technologies.

Cellular radio 1160 may be any type of radio that can communication within a cellular network. Examples include, but are not limited to, radios that communicate using orthogonal frequency division multiplexing (OFDM), code division multiple access (CDMA), time division multiple access (TDMA), and the like. Cellular radio 1160 may operate at any frequency or combination of frequencies without departing from the scope of the present invention. In some embodiments, cellular radio 1160 is omitted.

Audio circuits 1162 provide an interface between processor 1150 and audio devices such as a speaker and microphone.

Secure element 1164 provides secure information storage. In some embodiments, secure element 1163 is a smartcard compatible secure element commonly found in credit card applications and/or security applications.

NFC radio 1166 is a radio that provides near field communications capability to mobile device 300. In some embodiments, NFC radio 1166 operates at 13.56 megahertz, although this is not a limitation of the present invention.

In some embodiments, secure element 1164 and NFC radio 1166 are separate devices as shown in FIG. 11, and in other embodiments, secure element 1164 and NFC radio 1166 are combined into a single integrated circuit. In still further embodiments, one or both of secure element 1164 and NFC radio 1166 are integrated into another semiconductor device such as processor 1150.

Examples of smart card controllers that combine both secure element 1164 and NFC radio 1166 are the "SmartMX" controllers sold by NXP Semiconductors N.V. of Eindhoven, The Netherlands. In some embodiments, the secure element has an ISO/IEC 7816 compatible interface that communicates with other components within mobile device 300 (e.g., processor 1150), although this is not a limitation of the present invention. Further, in some embodiments, the NFC radio has an ISO/IEC 14443 contactless interface.

Mobile device 300 may include many other circuits and services that are not specifically shown in FIG. 11. For example, in some embodiments, mobile device 300 may include a global positioning system (GPS) radio, a Bluetooth radio, haptic feedback devices, and the like. Any number and/or type of circuits and services may be included within mobile device 300 without departing from the scope of the present invention.

Memory 1110 may include any type of memory device. For example, memory 1110 may include volatile memory such as static random access memory (SRAM), or nonvolatile memory such as FLASH memory. Memory 1110 is encoded with (or has stored therein) one or more software modules (or sets of instructions), that when accessed by processor 1150, result in processor 1150 performing various functions. In some embodiments, the software modules stored in memory 1110 may include an operating system (OS) 1120 and applications 1130. Applications 1130 may include any number or type of applications. Examples provided in FIG. 11 include a telephone application 1131, a contacts application 1132, a music player application 1133, a mobile payment application (Bank 12 Credit Card) 1134, a mobile banking application (Bank 42 Mobile Banking) 1135, and an email application 1136. Memory 1110 may also include any amount of space dedicated to data storage 1140.

Operating system 1120 may be a mobile device operating system such as an operating system to control a mobile phone, smartphone, tablet computer, laptop computer, or the like. As shown in FIG. 11, operating system 1120 includes user interface component 1121 and application installer component 1122. Operating system 1120 may include many other components without departing from the scope of the present invention.

User interface component 1121 includes processor instructions that cause mobile device 300 to display desktop screens, recognize gestures, provide navigation between desktop screens and enforce authentication rules when accessing password protected desktop screens. In addition, user interface 1121 includes instructions that cause processor 1150 to display various desktop screen indicators (see FIG. 10) as a user navigates across desktop screens. User interface 1121 also includes instructions to display menus, move icons, and manage other portions of the display environment.

Application installer component 1122 installs applications to mobile device 300. In some embodiments, application installer component 1122 determines whether to install applications to password protected desktop screens. For example, in some embodiments, applications that access secure element 1164 are installed to password protected desktop screens, whereas applications that do not access secure element 1164 are installed to non-password-protected desktop screens.

Application installer component 1122 may use any criteria to determine the desktop screen to which an application will be installed. For example, application installer component 1122 may determine the installation location based on mobile device services used by the application when running. This may be determined by inspecting which application programming interfaces (APIs) are access by the application. In other embodiments, the application is provided with information that dictates the installation location. For example, an application developer or certification authority may provide information with the application that dictates the application installation location.

Telephone application 1131 may be an application that controls a cell phone radio. Contacts application 1132 includes software that organizes contact information. Contacts application 1132 may communicate with telephone application 1131 to facilitate phone calls to contacts. Music player application 1133 may be a software application that plays music files that are stored in data store 1140.

Mobile payment application 1134 may be a software application that provides access to one or more payment instruments such as credit cards, debit cards, and pre-paid cards. In some embodiments, mobile payment application 1134 communicates with smartcard secure element 1164 and/or NFC radio 1166 within mobile device 300. For example, mobile payment application 1134 may store and access payment identities in smartcard secure element 1164 and allow proximity payments using NFC radio 1166.

Mobile banking application 1135 may be a software application that communicates with a banking service to allow banking functions such as balance inquiries, funds transfers, bill payment and the like. Mobile banking application 1135 may be a downloaded "thick" application, or may be a "thin" application that uses internet browser functionality. Other application examples include applications that store an identity such as a passport or a building access identity.

Each of the above-identified applications correspond to a set of instructions for performing one or more functions described above. These applications (sets of instructions) need not be implemented as separate software programs, procedures or modules, and thus various subsets of these applications may be combined or otherwise re-arranged in various embodiments. For example, telephone application 1131 may be combined with contacts application 1132. Furthermore, memory 1110 may store additional applications (e.g., video players, camera applications, etc.) and data structures not described above.

It should be noted that device 300 is presented as an example of a mobile device, and that device 300 may have more or fewer components than shown, may combine two or more components, or may have a different configuration or arrangement of components. For example, mobile device 300 may include many more components such as sensors (optical, touch, proximity etc.), or any other components suitable for use in a mobile device.

Memory 1110 represents a computer-readable medium capable of storing instructions, that when accessed by processor 1150, result in the processor performing as described herein. For example, when processor 1150 accesses instructions within user interface application 1121, processor 1150 recognizes gestures and requires additional authentication when navigating from a non-password-protected desktop screen to a password protected desktop screen.

Figure 12:
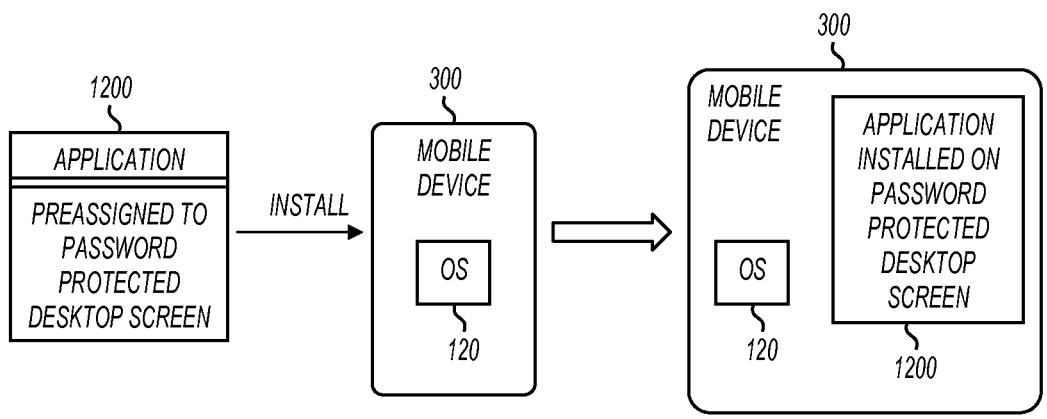
FIGS. 12 and 13 show applications being installed on a mobile device in accordance with various embodiments of the present invention.
Figure 13:
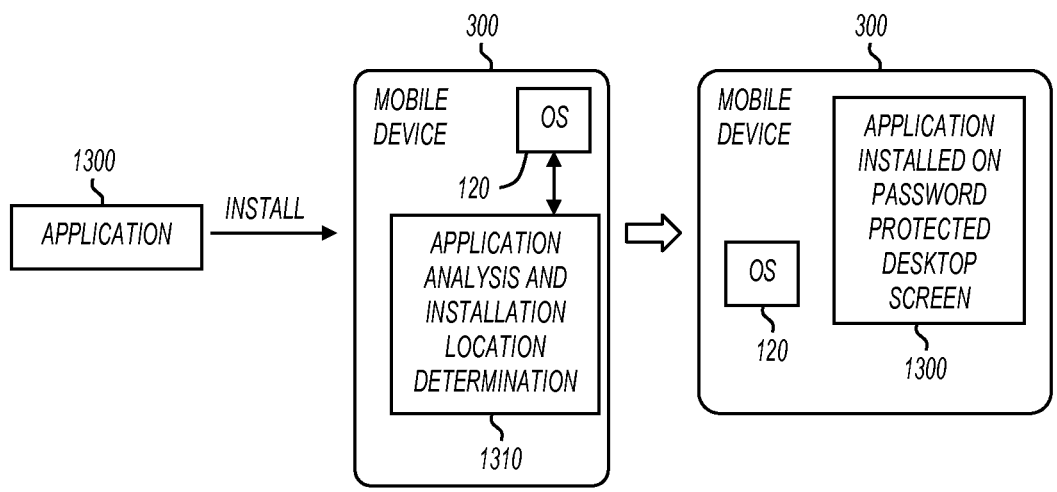

FIGS. 12 and 13 show applications being installed on a mobile device in accordance with various embodiments of the present invention. FIG. 12 shows application 1200 being installed on mobile device 300. Application 1200 may be any type of application that can be installed on a mobile device. Example applications are shown in FIG. 11. Other examples include video players, games, email clients, or any other type of application. Mobile device 300 may be any type of mobile device. For example, mobile device 300 may be a cell phone, smartphone, tablet computer, laptop computer, or the like. Further, mobile device 300 may restrict access to services by applications based on hardware control, software control, or any combination. An example mobile device architecture is shown in FIG. 11.

As shown in FIG. 12, application 1200 includes pre-assigned password protected desktop screen information. This information may specify whether the application is to be installed to a password protected desktop screen, and if so, which one. The pre-assigned password protected desktop screen information may originate from any source. For example, in some embodiments, a certification authority may analyze applications and assign desktop screens to applications. Also for example, in other embodiments, an application developer may make password protected desktop screen assignments. When application 1200 is installed on mobile device 300, the application is installed to the pre-assigned password protected desktop screen as shown in FIG. 12.

FIG. 13 shows application 1300 being installed on mobile device 300. Application 1300 may be any type of application that can be installed on a mobile device. Example applications are shown in FIG. 11. Other examples include video players, games, email clients, or any other type of application. Mobile device 300 may be any type of mobile device. For example, mobile device 300 may be a cell phone, smartphone, tablet computer, laptop computer, or the like. Further, mobile device 300 may restrict access to services by applications based on hardware control, software control, or any combination.

As shown in FIG. 13, application 1300 does not include pre-assigned password protected desktop screen information. When application 1300 is installed on mobile device 300, the application is analyzed and assigned to either a non-password-protected desktop screen or a password protected desktop screen. In some embodiments, the functions of application analysis and installation location determination component 1310 are performed when processor 1150 executes instructions in application installer component 1122 (FIG. 11). The application may be analyzed based on any criteria and installed accordingly. For example, the application may be analyzed to determine which application programming interfaces (API) are accessed at runtime, and the application will be installed to a password protected desktop screen on API usage.

Figure 14:
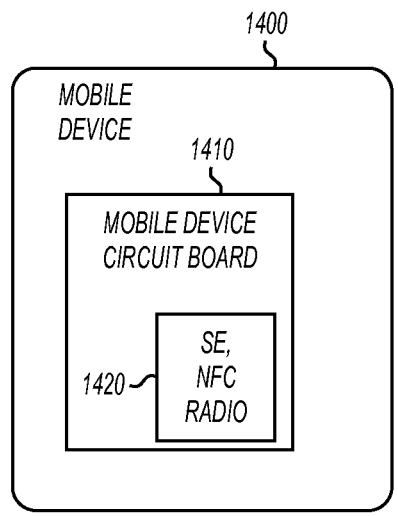
FIG. 14 shows a mobile device with a secure element and near field communications (NFC) radio on a circuit board in accordance with various embodiments of the present invention.

FIG. 14 shows a mobile device with a secure element and near field communications (NFC) radio on a circuit board in accordance with various embodiments of the present invention. Mobile device 1400 includes circuit board 1410, which in turn includes secure element (SE) and NFC radio 1420. In some embodiments, SE and NFC radio 1420 are packaged in a single integrated circuit such as a dual interface smartcard controller, and in other embodiments, they are packaged separately. Circuit board 1410 may include a processor, memory, or circuits that support other services. In some embodiments, circuit board 1410 is a board that is fixed within mobile device 1400 and that includes many components other than those shown.

In some embodiments, SE and NFC radio 1420 reside in an add-on slot on the circuit board, and they may be removable or nonremovable. For example, in some embodiments, an add-on slot may be provided on circuit board 1410 to accept SE and NFC radio 1420. In some of these embodiments, SE and NFC radio 1420 may be user accessible and removable, and in other embodiments, SE and NFC radio 1420 may be nonremovable even though they reside in an add-on slot.

Figure 15:
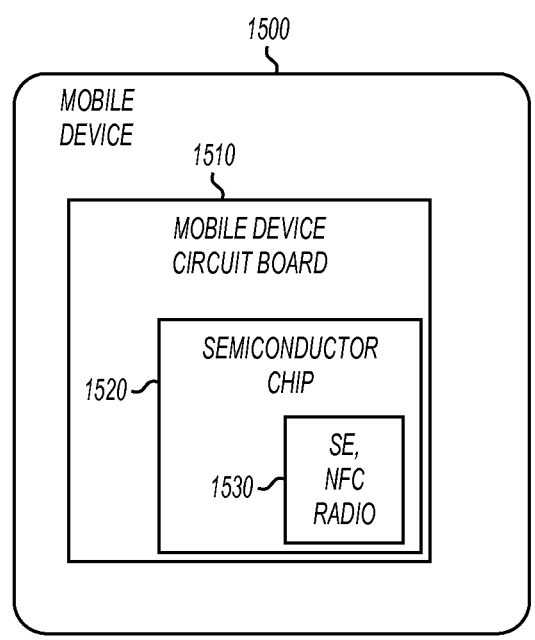
FIG. 15 shows a mobile device with a secure element and an NFC radio in a semiconductor chip in accordance with various embodiments of the present invention.

FIG. 15 shows a mobile device with a secure element and an NFC radio in a semiconductor chip in accordance with various embodiments of the present invention. Mobile device 1500 includes circuit board 1510, which in turn includes semiconductor chip 1530. Semiconductor chip also includes SE and NFC radio 1530. In some embodiments, the semiconductor chip includes other functionality such as a microprocessor. In these embodiments, SE and NFC radio 1530 are embedded within the semiconductor chip 1520. Circuit board 1510 includes circuits that provide one or more services. For example, circuit board 1510 may include a memory, a display controller, a cellular radio, or the like. In some embodiments, circuit board 1510 is a board that is fixed within mobile device 1500 and that includes many components other than those shown.

In some embodiments, SE and NFC radio 1530 reside in an add-on slot in the semiconductor chip, and the semiconductor chip resides in an add-on slot on the circuit board, and both may be removable or nonremovable.

Figure 16:
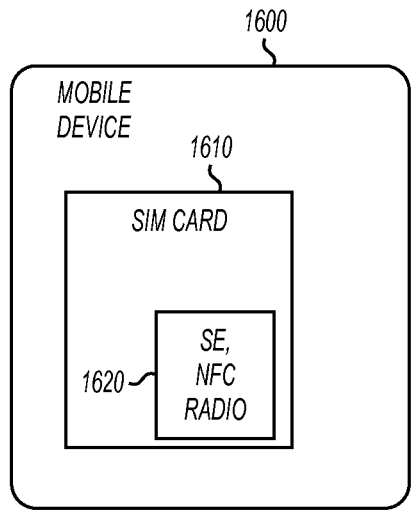
FIG. 16 shows a mobile device with a secure element and an NFC radio on a subscriber identity module (SIM) card in accordance with various embodiments of the present invention.

FIG. 16 shows a mobile device with a secure element and an NFC radio on a subscriber identity module (SIM) card in accordance with various embodiments of the present invention. Mobile device 1600 includes subscriber identity module (SIM) 1610, which in turn includes secure element (SE) and NFC radio 1620. SIM 1610 includes circuits that provide one or more services. For example, SIM 1610 may include other circuits that identify a user of mobile device 1600 to a mobile network operator. In some embodiments, SIM card 1610 is a removable card that is inserted into an add-on slot within mobile device 1600 and that includes many components other than those shown. In some embodiments, SIM card 1610 may be added to a non-removable add-on slot.

Figure 17:
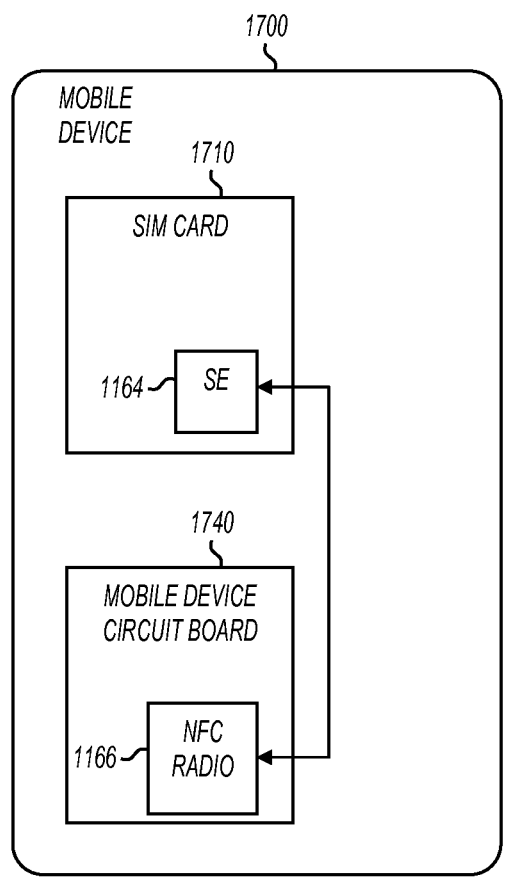
FIG. 17 shows a mobile device with secure element on a SIM card and an NFC radio on a circuit board in accordance with various embodiments of the present invention.

FIG. 17 shows a mobile device with secure element on a SIM card and an NFC radio on a circuit board in accordance with various embodiments of the present invention. Mobile device 1700 includes subscriber identity module (SIM) card 1710, and circuit board 1740. SIM 1710 and circuit board 1740 include circuits that provide one or more services. For example, SIM 1710 may include a secure element 1164, and circuit board 1164 includes NFC radio 1166. In some embodiments, SIM 1610 may include other circuits that identify a user of mobile device 1600 to a mobile network operator. In some embodiments, SIM card 1610 is a removable card that is inserted into an add-on slot within mobile device 1700 and that includes many components other than those shown. Also for example, circuit board 1740 may include a processor, memory, or circuits that support other services. In some embodiments, circuit board 1740 is a board that is fixed within mobile device 1700 and that includes many components other than those shown.

Figure 18:
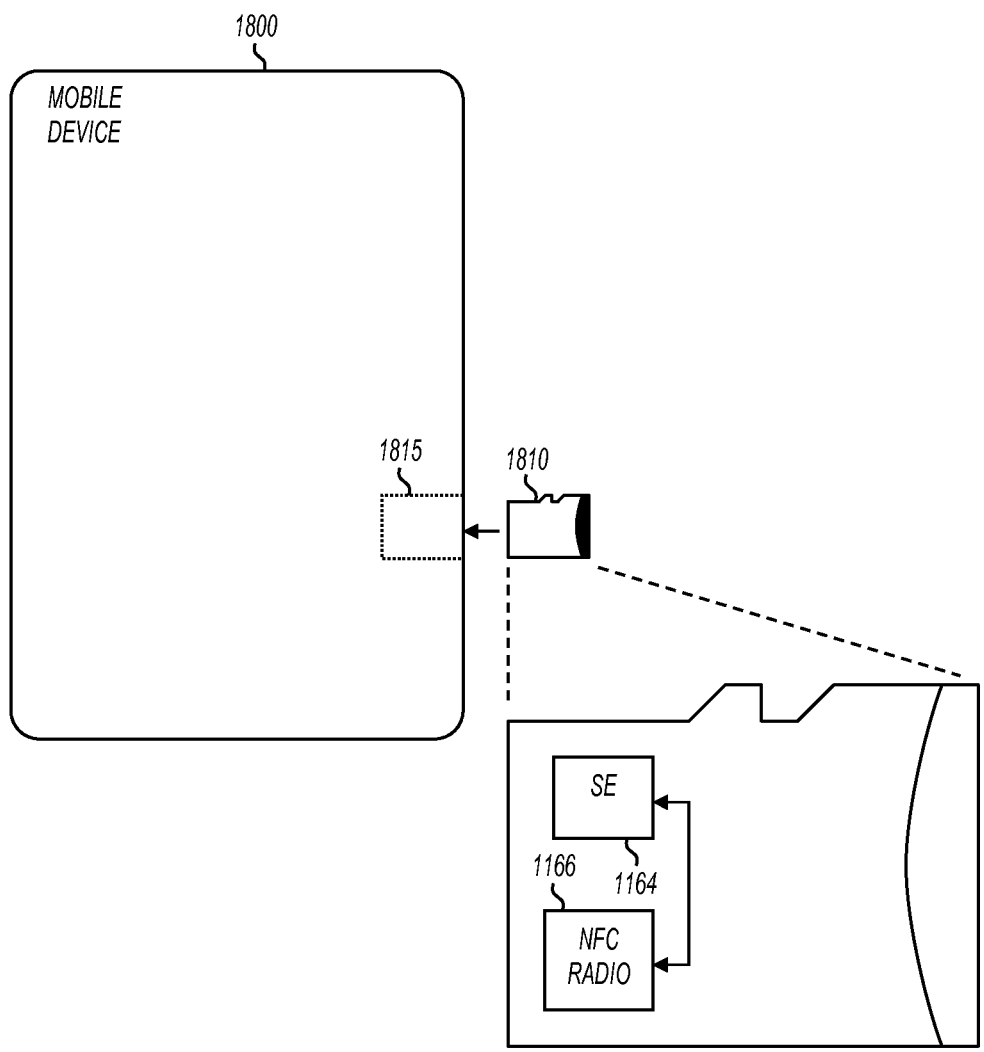
FIGS. 18 and 19 show mobile devices with memory cards that include secure elements in accordance with various embodiments of the present invention.
Figure 19:
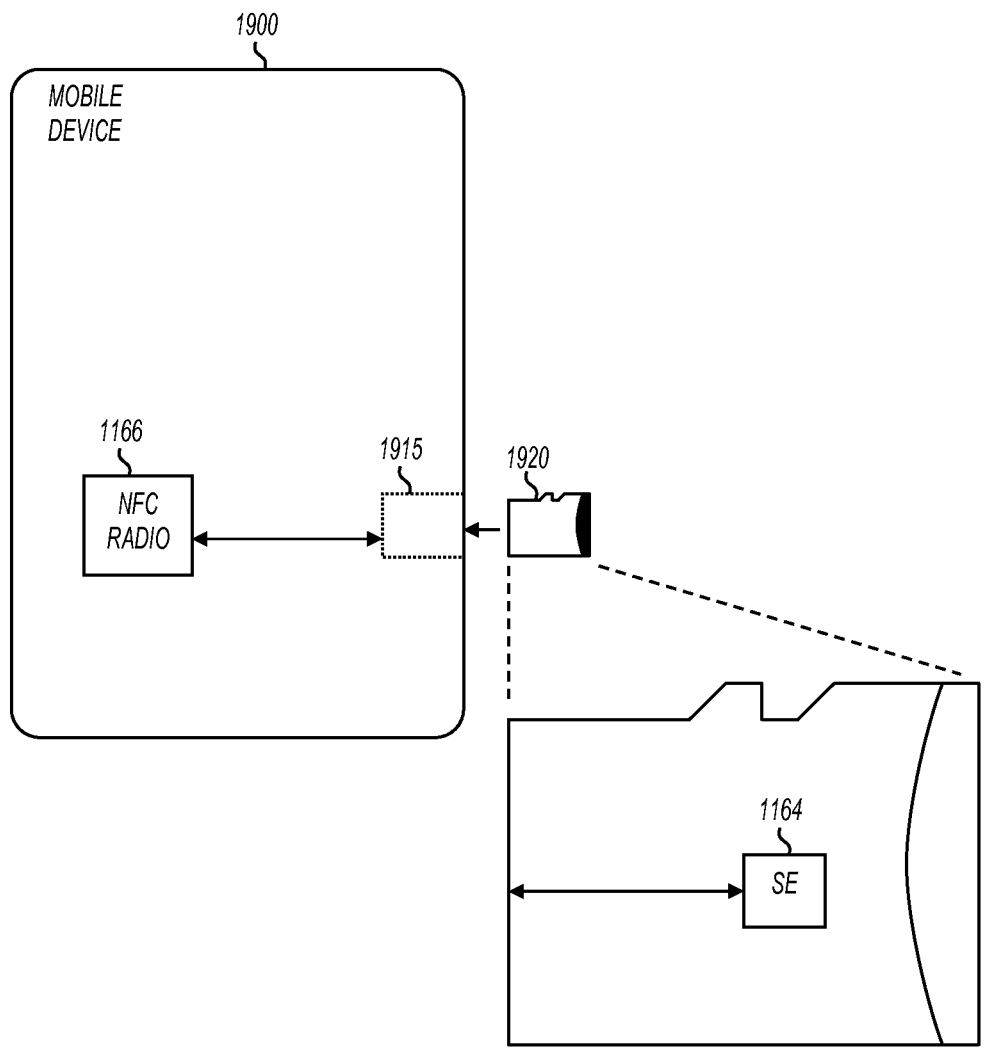

FIGS. 18 and 19 show mobile devices with memory cards that include secure elements in accordance with various embodiments of the present invention. Mobile device 1800 includes add-on slot 1815. Add-on slot 1815 accepts memory card 1810, which is shown as a microSD memory card; however this is not a limitation of the present invention. In some embodiments, microSD memory card 1810 may be added to a non-removable add-on slot. For example, system memory for mobile device 1800 may be provided by memory card 1810, and memory card may be placed in an add-on slot in such a manner that it is nonremovable. Memory card 1810 includes NFC radio 1166 and secure element 1164. The combination of mobile device 1800 and memory card 1810 is an example of an electronic system that includes a mobile device and an add-on card that includes a secure element and NFC radio. Referring now to FIG. 19, mobile device 1900 includes NFC radio 1166 and add-on slot 1915. Add-on slot 1915 accepts memory card 1920, which is shown as a microSD memory card; however this is not a limitation of the present invention. Memory card 1920 includes secure element 1164.

Figure 20:
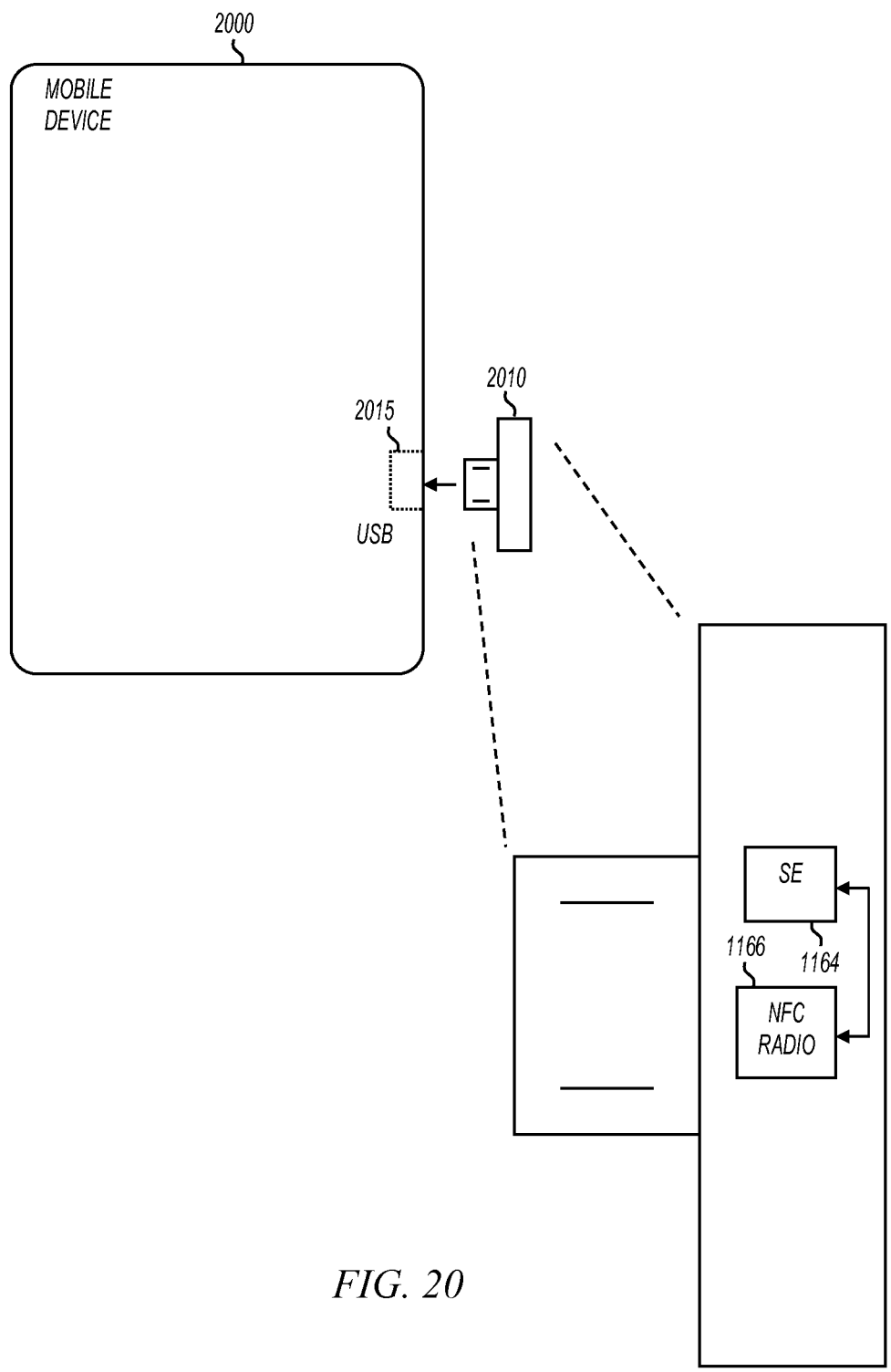
FIGS. 20 and 21 show mobile devices with universal serial bus (USB) devices that include secure elements in accordance with various embodiments of the present invention.
Figure 21:
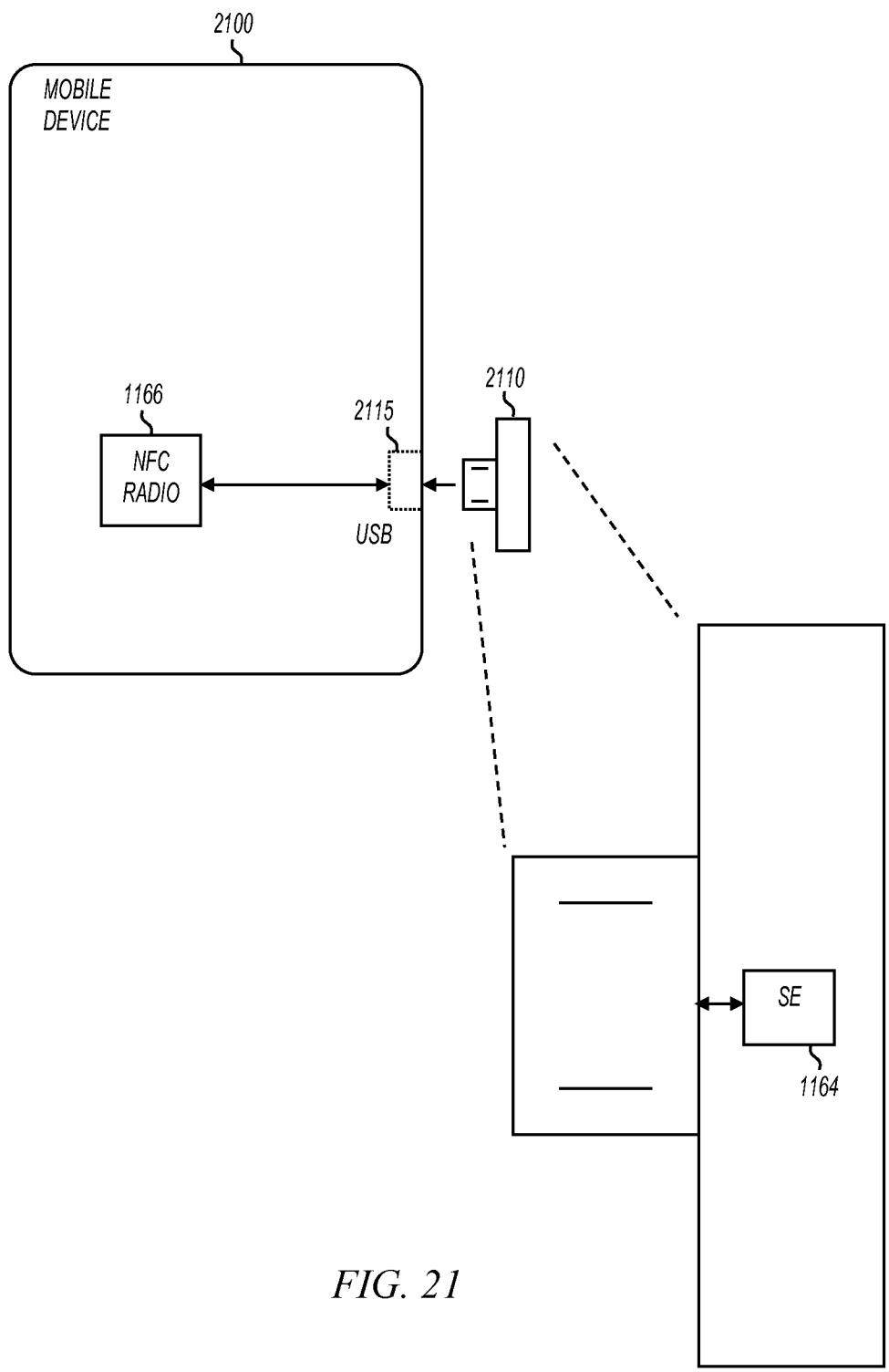

FIGS. 20 and 21 show mobile devices with universal serial bus (USB) devices that include secure elements in accordance with various embodiments of the present invention. Mobile device 2000 includes add-on slot 2015. Add-on slot 2015 is shown as a universal serial bus (USB) port which accepts USB dongle 2010; however this is not a limitation of the present invention. Add-on slot 2015 may be other than a USB port, and device or dongle 2010 may be other than a USB dongle. USB dongle 2010 includes NFC radio 1166 and secure element 1164. The combination of mobile device 2000 and USB dongle 2010 is an example of an electronic system that includes a mobile device and an add-on card that includes a secure element and NFC radio. Referring now to FIG. 21, mobile device 2100 includes NFC radio 1166 and add-on slot 2115. Add-on slot 2115 accepts USB dongle 2120, which includes secure element 1164. In some embodiments, USB device 1610 may be added to a non-removable add-on slot.

In some embodiments the device with the SE or the device with the SE and NFC may not be physically present in a add-on slot. It may be coupled via any combination of electric, magnetic, and optical means such as Bluetooth, NFC, infrared.

Figure 22:
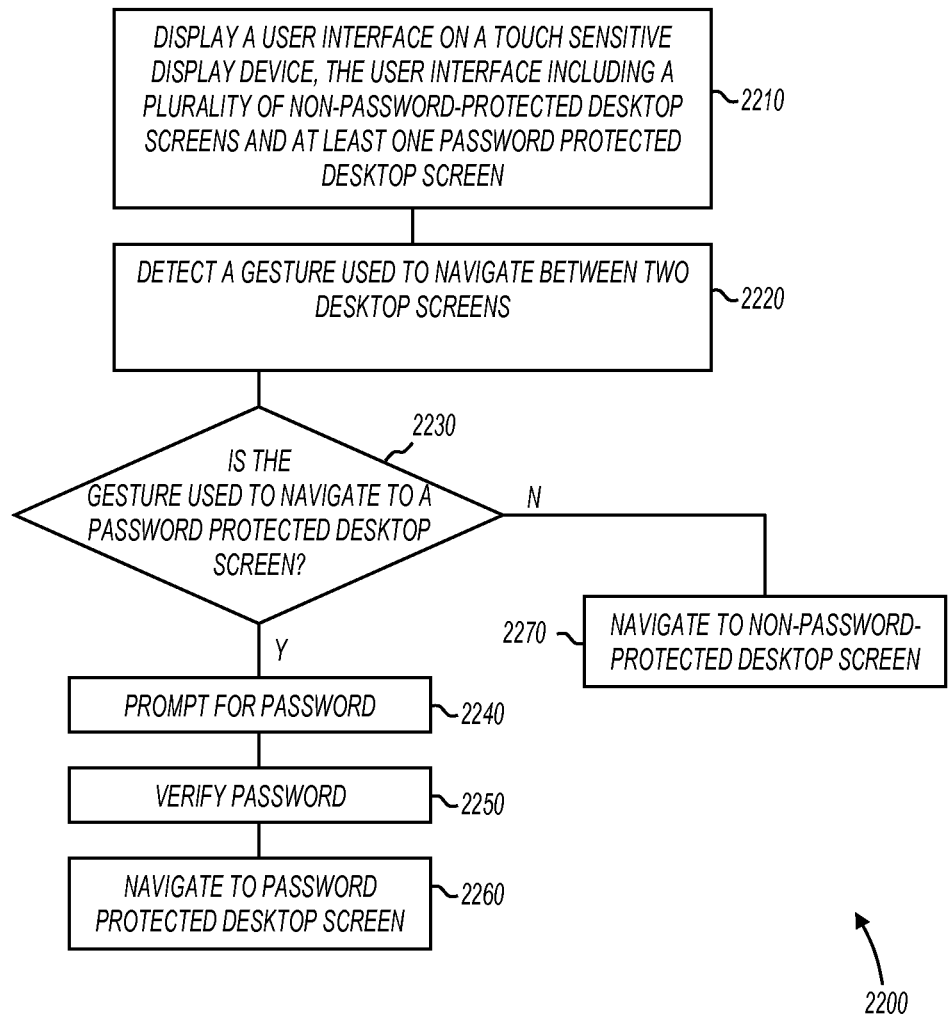
FIGS. 22 and 23 show flowcharts of methods in accordance with various embodiments of the present invention.

FIG. 22 shows a flowchart of methods in accordance with various embodiments of the present invention. In some embodiments, method 2200 may be performed by a mobile device such as any of mobile devices 300, 1400, 1500, 1600, 1700, 1800, 1900, 2000, or 2100. Further, in some embodiments, method 2200 may be performed by a processor that is executing software such as user interface component 1121 and/or application installer component 1122. Method 2200 is not limited by the type of system or entity that performs the method. The various actions in method 2200 may be performed in the order presented, in a different order, or simultaneously. Further, in some embodiments, some actions listed in FIG. 22 are omitted from method 2200.

Method 2200 begins at 2210 in which a user interface is displayed on a touch sensitive display device. The user interface includes a plurality of non-password-protected desktop screens and at least one password protected desktop screen. Examples of logical orientations of non-password protected desktop screens and password protected screens are shown in FIGS. 4, 8, and 9. The remaining portion of method 2200 is described with the desktop screens in FIG. 4 as examples; however, method 2200 is equally applicable to any logical orientation of desktop screens.

At 2220, a gesture is detected at the touch sensitive display device. The gesture may be a gesture used to navigate between desktop screens, such as gesture 312 or gesture 314 (FIG. 3). At 2230, the gesture is analyzed to determine if it is used to navigate from a non-password-protected desktop screen to a password protected desktop screen. If not, then the navigation to the non-password protected desktop screen takes place without additional authentication at 2270. If, on the other hand, the gesture is recognized as one that will navigate from a non-password-protected desktop screen to a password protected desktop screen, method 2200 prompts for a password at 2240. An example screenshot of a password prompt in accordance with 2240 is shown in FIG. 5.

At 2250, the password is verified. In some embodiments, this includes accessing a secure element such as secure element 1164. The password may be passed to secure element 1164 and secure element 1164 determines the validity of the password. In other embodiments, the password is verified without accessing the secure elements. When the password is verified, the user interface navigates to a password protected desktop screen at 2260.

Figure 23:
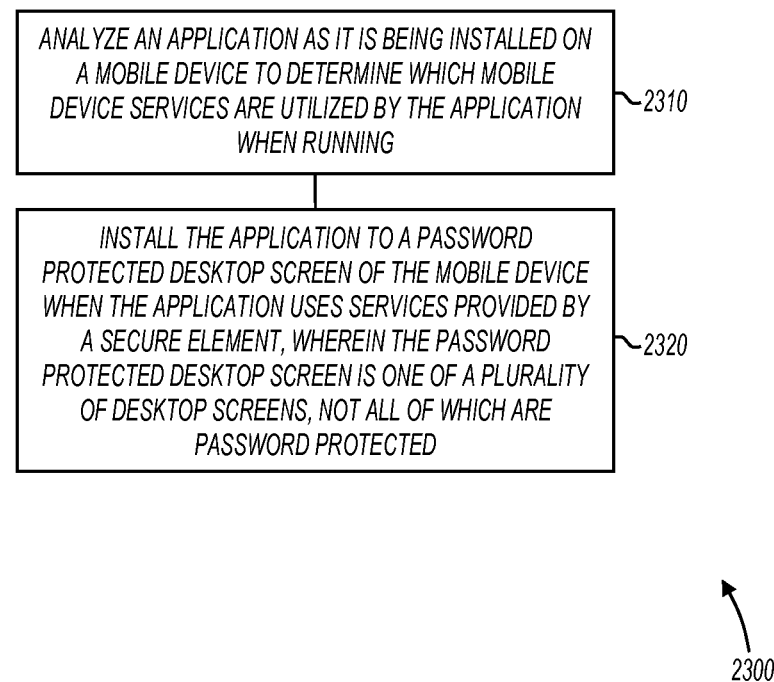

FIG. 23 shows a flowchart of methods in accordance with various embodiments of the present invention. In some embodiments, method 2300 may be performed by a mobile device such as any of mobile devices 300, 1400, 1500, 1600, 1700, 1800, 1900, 2000, or 2100. Further, in some embodiments, method 2300 may be performed by a processor that is executing software such as user interface component 1121 and/or application installer component 1122. Method 2300 is not limited by the type of system or entity that performs the method. The various actions in method 2300 may be performed in the order presented, in a different order, or simultaneously. Further, in some embodiments, some actions listed in FIG. 23 are omitted from method 2300.

Method 2300 begins at 2310 in which an application is analyzed as it is being installed on a mobile device to determine which mobile device services are utilized by the application when running. In some embodiments, the application is analyzed to determine which application programming interfaces (API) are accessed. In other embodiments, the application is analyzed by interpreting information supplied with the application. For example, application installation location information supplied with the application may be provided by a certification authority of an application developer.

At 2320, the application is installed to a password protected desktop screen of the mobile device based on the results of the analyzing that occurs at 2310. For example, in some embodiments, if the application being installed accesses secure element APIs, then the application is deemed to use services provided by the secure element, and the application is installed to a password protected desktop screen. The password protected screen to which the application is installed is one of a plurality of desktop screens, not all of which are password protected. For example, the application may be installed to password protected desktop screen 450 (FIG. 4).

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A mobile device comprising:
 a secure element; and
 a touch sensitive display device that allows a user to navigate between desktop screens using gestures, the desktop screens displaying icons used to launch applications, wherein a first plurality of the desktop screens are password protected and a second plurality of the desktop screens are non-password protected, wherein the mobile device analyzes each application being installed on the mobile device, and installs the application to a password protected desktop screen when the application uses services provided by the secure element when running, and wherein the mobile device prompts for user authentication when detecting a gesture to navigate to a password protected desktop screen from a non-password protected desktop screen, the desktop screens further displaying at least one row of desktop screen indicators to indicate a logical orientation of the desktop screens and whether the desktop screen currently displayed is one of the first plurality of password protected desktop screens.

2. The mobile device of claim 1 wherein the at least one row of desktop indicators includes a multiple row indicator.

3. The mobile device of claim 1 wherein the at least one row of desktop screen indicators indicates that the desktop screen currently displayed is a mobile wallet desktop screen.

4. The mobile device of claim 1 wherein the at least one row of desktop screen indicators includes multiple rows of indicators.

5. The mobile device of claim 1 wherein the at least one row of desktop screen indicators includes a single row of indicators with at least one additional icon to indicate a current row.

6. The mobile device of claim 1 wherein the at least one row of desktop screen indicators includes a single row of indicators with at least one additional icon to indicate a scroll direction.

7. A mobile device comprising:
 a processor;
 a secure element;
 a touch sensitive display device;
 a memory; and
 a program, wherein the program is stored in the memory and configured to be executed by the processor, the program including instructions for:
  analyzing an application to be installed on the mobile device;
  installing the application to one of a plurality of password protected desktop screens when the application uses services provided by the secure element when running, wherein the plurality of password protected desktop screens are part of a user interface that also includes a plurality of non-password-protected desktop screens;
  navigating between the plurality of non-password protected desktop screens using a first gesture;
  navigating from one of the plurality of non-password protected desktop screens to one of the plurality of password protected desktop screens using a second gesture; and
  displaying at least one row of desktop screen indicators to indicate a logical orientation of the desktop screens and whether the desktop screen currently displayed is one of the plurality of password protected desktop screens.

8. The mobile device of claim 7 wherein the at least one row of desktop screen indicators includes a lock icon.

9. The mobile device of claim 7 wherein the at least one row of desktop indicators includes a multiple row indicator.

10. The mobile device of claim 7 wherein the at least one row of desktop screen indicators includes a dollar sign icon.

11. The mobile device of claim 7 wherein the at least one row of desktop screen indicators indicates that the desktop screen currently displayed is a mobile wallet desktop screen.

* * * * *